(12) United States Patent
Gilbert

(10) Patent No.: US 6,172,985 B1
(45) Date of Patent: Jan. 9, 2001

(54) AUTOMATIC DETECTION OF POTS LINE

(75) Inventor: Timothy G. Gilbert, Vermillion, SD (US)

(73) Assignee: Gateway 2000, Inc., North Sioux City, SD (US)

(*) Notice: Under 35 U.S.C. 154(b), the term of this patent shall be extended for 0 days.

(21) Appl. No.: 09/014,726

(22) Filed: Jan. 28, 1998

(51) Int. Cl.[7] .................................................. H04J 3/16
(52) U.S. Cl. ........................ 370/465; 370/252; 370/389
(58) Field of Search ................................... 370/465, 252, 370/389, 390, 242; 709/249

(56) References Cited

U.S. PATENT DOCUMENTS

| | | | |
|---|---|---|---|
| 4,697,281 | 9/1987 | O'sullivan | 379/59 |
| 4,884,269 | 11/1989 | Duncanson et al. | 370/110.1 |
| 4,958,369 | 9/1990 | Tsuchida | 379/156 |
| 4,972,457 | 11/1990 | O'sullivan | 379/59 |
| 4,991,197 | 2/1991 | Morris | 379/58 |
| 5,067,125 | 11/1991 | Tsuchida | 379/79 |
| 5,113,396 | 5/1992 | Kagami | 370/110.2 |
| 5,142,568 | 8/1992 | Ogata et al. | 379/100 |
| 5,244,402 | 9/1993 | Pasterchick, Jr. et al. | 439/217 |
| 5,255,317 | 10/1993 | Arai et al. | 379/399 |
| 5,305,312 | 4/1994 | Fornek et al. | 370/62 |
| 5,305,377 | 4/1994 | D'Arcy et al. | 379/399 |
| 5,337,346 | 8/1994 | Uchikura | 379/58 |
| 5,396,536 | 3/1995 | Yudlowsky | 379/52 |
| 5,396,541 | 3/1995 | Farwell et al. | 379/60 |
| 5,408,520 | 4/1995 | Clark et al. | 379/93 |
| 5,425,031 | 6/1995 | Otsuka | 370/95.1 |
| 5,428,668 | 6/1995 | Dent et al. | 379/59 |

(List continued on next page.)

OTHER PUBLICATIONS

"AT&T V.32bis/V.32/FAX High–Speed Data Pump Chip Sets Data Book", Published by AT&T Microelectronics, pp. 1–91, F1–F15, B13 (Dec. 1991).
"Introducing AIRplex", http://kiwi.futuris.net/kme/, Product information from K and M Electronics, Inc., 1 page, (1995).
"Kiss Cables Good–bye", http://www.portablecomputing.com/premier/162 htm, Product review of IBM cordless modem, 2 pages, (Apr. 8, 1997).
Pargh, A., http://www.gadgetguru.com/aol/reviews/152.shtml, Product review of IBM cordless modem, 2 pages, (1997).
IBM Announcement Letters, http://www1.ibmlink.ibm.com/cgi–bi, 1 page (1995).
"IBM's Waverunner Nominated for Networking Industry Awards 'ISDN Product of the Year'", M2 Presswire, M2 Communications, pp. 2–4 (Jul. 7, 1995).
"Integrated Services Digital Network (ISDN) Basic Access Interface for Use on Metallic Loops for Application on the Network Side of the NT", American National Standard for Telecommunications T1.601–1992, Cover page, pp. 49–50, (Feb. 21, 1992).

(List continued on next page.)

Primary Examiner—Michael Horabik
Assistant Examiner—Prenell Jones
(74) Attorney, Agent, or Firm—Schwegman, Lundberg, Woessner & Kluth, P.A.

(57) ABSTRACT

The automatic detection of plain-old telephone system (POTS) lines. A line-type detector detects the particular type of communications line and preferably correspondingly configures a communications device, depending on whether POTS was detected or not. The detection is preferably accomplished by detecting the two dial tone frequencies present in a POTS line.

12 Claims, 3 Drawing Sheets

U.S. PATENT DOCUMENTS

| | | | |
|---|---|---|---|
| 5,428,671 | 6/1995 | Dykes et al. .............................. | 379/93 |
| 5,448,635 | 9/1995 | Biehl et al. ........................... | 379/399 |
| 5,452,289 | 9/1995 | Sharma et al. ....................... | 370/32.1 |
| 5,459,788 | 10/1995 | Kim ...................................... | 379/399 |
| 5,473,638 | 12/1995 | Marchetto et al. ................... | 375/356 |
| 5,487,175 | 1/1996 | Bayley et al. ....................... | 455/54.2 |
| 5,513,248 | 4/1996 | Evans et al. ........................... | 379/61 |
| 5,517,553 | 5/1996 | Sato ...................................... | 379/59 |
| 5,528,593 | 6/1996 | English et al. ......................... | 370/84 |
| 5,559,860 | 9/1996 | Mizikovsky ........................... | 379/58 |
| 5,574,725 | 11/1996 | Sharma et al. ......................... | 370/79 |
| 5,574,773 | 11/1996 | Grob et al. ............................. | 379/59 |
| 5,606,594 | 2/1997 | Register et al. ....................... | 379/58 |
| 5,629,926 | 5/1997 | Deutsch et al. . | |
| 5,633,920 | 5/1997 | Kikinis et al. ....................... | 379/130 |
| 5,675,524 | 10/1997 | Bernard ........................... | 364/705.05 |
| 5,715,238 | 2/1998 | Hall, Jr. et al. ...................... | 370/242 |
| 5,715,241 * | 2/1998 | Glass, III et al. ................... | 370/252 |
| 5,787,360 | 7/1998 | Johnston et al. ..................... | 455/524 |
| 5,802,476 | 9/1998 | Nakajima et al. ................... | 455/462 |
| 5,812,951 | 9/1998 | Ganesan et al. ..................... | 455/445 |
| 5,857,157 | 1/1999 | Shindo ................................. | 455/550 |
| 5,864,758 | 1/1999 | Moon .................................. | 455/424 |
| 5,884,190 | 3/1999 | Lintula et al. ....................... | 455/557 |
| 5,906,873 * | 5/1999 | Hartmann et al. ................... | 370/389 |
| 5,930,719 | 7/1999 | Babitch et al. ....................... | 455/462 |
| 5,953,674 | 9/1999 | Hutchison ........................... | 455/557 |

OTHER PUBLICATIONS

"TMS320C3x", Texas Instruments User's Guide for Digital Signal Processing Product No. TMS320C3x, Revision J, Cover page, Title page and pp. 1.1–1.10 (Oct. 1994).

"V:32bis/V.32/FAX High–Speed Data Pump Chip Sets Data Book", Published by AT&T Microelectronics, pp. 1–91 (Dec. 1991).

"WaveRunner Digital Modems", http://www.pc.ibm.com/options/g2214076.html#dagtb, pp. 1–8 (1994).

Bryce, J.Y., "Using ISDN", Published by Que Corporation, Cover page, Title page and Table of Contents (1995).

Pearlstein, J., "Farallon Introduces Netopia ISDN Modem", *MacWEEK*, vol. 10, No. 2, 1 page, (Jan. 15, 1996).

Pearlstein, J., "ISU Express adds POTS to ISDN", *MacWEEK*, vol. 9, No. 41, 2 pages, (Oct. 16, 1995).

Tam, T., "Exploiting ISDN Services to the Fullest", *PC Week*, vol. 12, No. 3, 3 pages, (Jan. 23, 1995).

* cited by examiner

AUTOMATIC DETECTION OF POTS LINE

FIELD OF THE INVENTION

This invention relates generally to the detection of a particular type of communications line, and particularly to the automatic detection of plain old telephone service (POTS) communications lines.

BACKGROUND OF THE INVENTION

Remote communications have become increasingly popular in conjunction with the use of computers. For example, a user may log onto a network or the Internet through a modem plugged into a communications line. This enables the user to access information stored on the network, or access information stored on servers also connected to the Internet.

In the past, remote access typically required that the user use an analog modem to plug into a POTS communications line. Other alternatives were not available. POTS communications is advantageous in that POTS is nearly ubiquitous, but disadvantageous in that it does not provide for high-bandwidth communications, limiting its usefulness in voluminous data transfer applications such as multimedia.

Recently, however, another alternative has become sufficiently commonplace to be an adequate alternative to communications over a POTS line. This alternative is ISDN. Communication over an ISDN communications line requires a different type of device, what is known within the art as an ISDN terminal adapter, or alternatively an ISDN modem. ISDN communications is advantageous in that ISDN provides for much higher bandwidth communications as compared to POTS, but is disadvantageous in that it is still not nearly as commonplace as is the ubiquitous POTS.

Therefore, a user desiring to having the best of both worlds is forced to have both an analog modem for POTS communications, and a terminal adapter for ISDN communications. Thus, when ISDN is available, the user may take advantage of the higher bandwidth so afforded, but still has POTS to fall back on when ISDN is not available. This carrying of two devices is disadvantageous especially for the portable computer user, who typically places a premium on minimizing the weight of the equipment that must be carried with the portable computer.

A more serious problem, however, is that the user may accidentally plug a terminal adapter to a jack for a POTS communications line, or a modem to a jack for an ISDN communications line. In the latter case, the modem will likely just merely not work with the ISDN line. However, in the former case, the terminal adapter may be damaged as a result of it having been plugged into the POTS line.

Therefore, there is a need for a communications device that is amenable to both POTS and ISDN communications. There is a further need for such a device to detect whether the device has been plugged it into either a POTS or ISDN line, and configure the device accordingly.

SUMMARY OF THE INVENTION

The above-mentioned shortcomings are addressed by the present invention, which will be understood by reading and studying the following specification. The invention describes the automatic detection of POTS communications lines. A line-type detector operatively coupled to a communications device in one embodiment detects whether the particular type of communications line to which the device has been coupled is POTS and correspondingly configures the communications line. Preferably, the detection of POTS lines is accomplished by detecting the dial tone frequencies that are always present in a POTS line.

In this manner, a single communications device is operable in both a POTS environment and a non-POTS environment, such as ISDN. A portable computer user, for example, does not need to carry both an ISDN terminal adapter and a POTS analog modem. The line-type detector of the invention, when coupled to or integrated into a suitable communications device, permits the device to interface with both types of communications lines.

In different embodiments of the invention, computerized systems, communications device, and methods of varying scope are described. Still other and further aspects, advantages and embodiments of the invention will become apparent by reference to the drawings and by reading the following detailed description.

DETAILED DESCRIPTION OF THE INVENTION

In the following detailed description of the preferred embodiments, reference is made to the accompanying drawings which form a part hereof, and in which is shown by way of illustration specific preferred embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the appended claims.

Figure 1:
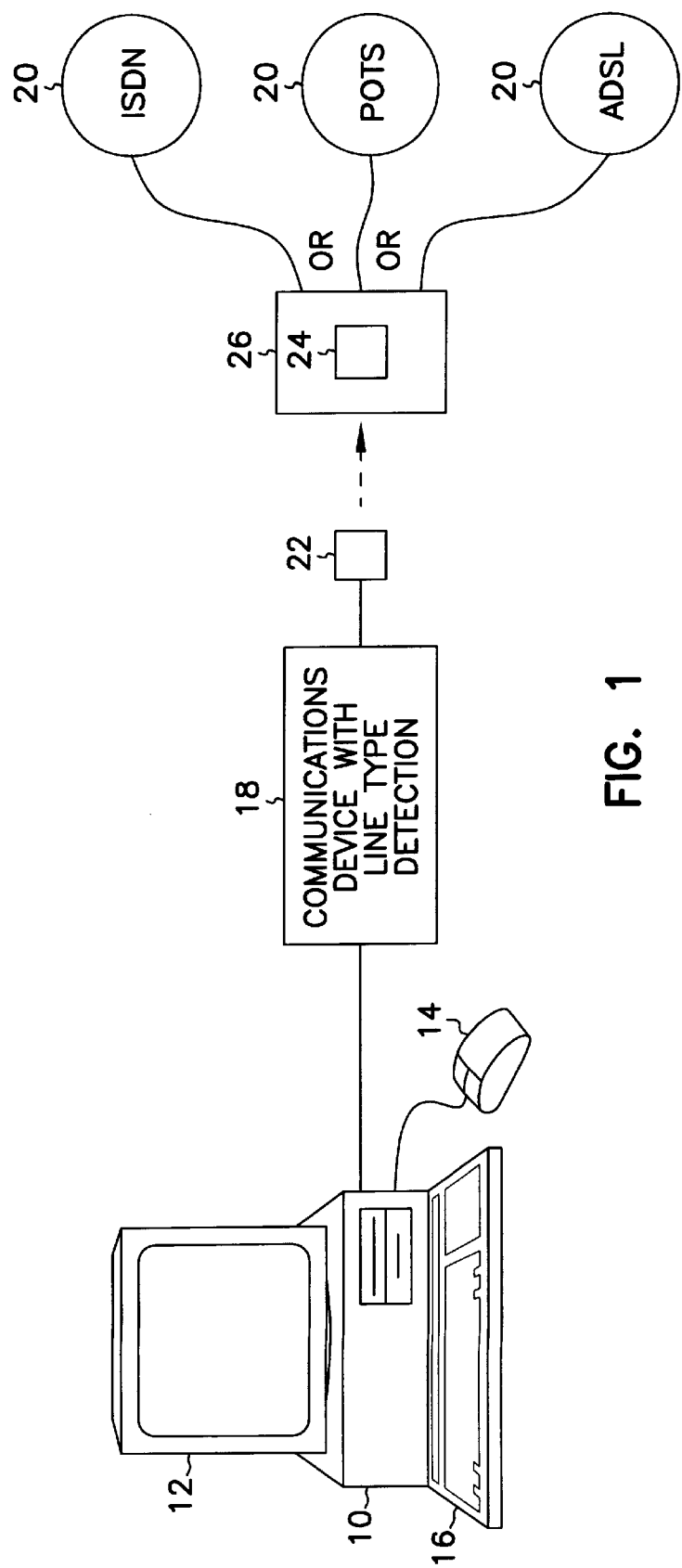
FIG. 1 is a diagram of a computerized system according to an embodiment of the invention.

Referring first to FIG. 1, a diagram of a computerized system according to an embodiment of the invention is shown. Computer 10 is coupled to monitor 12, pointing device 14, and keyboard 16. Computer 10 includes a processor (preferably, an Intel Pentium processor), random-access memory (preferably, at least sixteen megabytes), read-only memory (ROM), and one or more storage devices, such as a hard disk drive, a floppy disk drive, an optical disk drive, and a tape cartridge drive. The invention is not particularly limited to a given type of computer 10. Computer 10 is preferably a PC-compatible computer such as those manufactured and available from Gateway 2000, Inc., of Sioux City, S. Dak., and running a version of the Microsoft Windows operating system. The construction and operation of such computers are known within the art. Computer 10 may be either a portable or a desktop computer, as well.

Monitor 12 permits the display of information for viewing by a user of the computer. The invention is not limited to any particular monitor 12. Such monitors include cathode ray tube (CRT) displays, as well as flat panel displays such as liquid crystal displays (LCD's), and in one embodiment is a super-VGA CRT display. Pointing device 14 permits the control of the screen pointer provided by the graphic user interface of operating systems such as versions of Microsoft Windows. The invention is not limited to any particular pointing device 14. Such pointing devices include mouses, touch pads, trackball, and point sticks. Keyboard 16 permits textual entry into computer 10 as another input device to the computer, and typically includes a plurality of alphanumeric keys, function keys, navigation keys, cursor keys, and numeric keypad keys. However, the invention is not so particularly limited.

Computer 10 is also operatively coupled to communications device 18. Communications device 18 as shown in FIG. 1 is an external device to computer 10. However, the invention is not so limited, and communications device 18 may also be an internal device, either plugging into a slot within computer 10, or as a PCMCIA card plugging into a corresponding PCMCIA card slot within computer 10. Communications device 18 permits computer 10 to remotely connect to a network or the Internet.

Communications device 18 has capability to communicate with at least two types of communications systems 20, such as ISDN, POTS, or asynchronous digital subscriber line (ADSL). POTS is also known as public telephone switched network (PTSN). Preferably, communications device 18 includes analog modem capability to communicate over POTS, and a terminal adapter to communicate over ISDN. Alternatively, communications device 18 includes what is known in the art as ST interface capability to communicate over ADSL. Other communications systems that are amenable to the invention include other xDSL systems, such as high-speed digital subscriber line (HDSL) and symmetric digital subscriber line (SDSL). The invention is not limited in this regard. The construction and operation of communications devices having the ability to communicate over a single communications medium (e.g., only POTS, or only ISDN) are well known within the art. This specification enables one of ordinary skill within the art to modify such devices as described herein.

Communications device 18 has plug 22, which plugs into a corresponding jack 24 of wall plate 26 as shown. Plug 22 and jack 24 typically are corresponding RJ-11 or RJ-45 plugs and jacks, although the invention is not so limited. The same physically appearing jack 24 may be used regardless of the type of communications system 20 to which jack 24 is coupled; that is, the physical appearance of jack 24 may not be indicative of the type of line to which it is connected. For example, an RJ-45 jack may be coupled to either an ISDN or a POTS line.

Therefore, communications device 18 includes an integral line-type detector to determine the type of system 20 to which jack 24 is coupled, and configures accordingly. For example, jack 24 of wall plate 26 may be coupled to a communications line of a POTS communications system 20. When jack 22 of device 18 is plugged into such a jack 24, device 18 is able to detect when communications system 20 is POTS, and correspondingly utilize its analog modem capability. For further example, jack 24 of wall plate 26 may be coupled to a communications line of an ISDN system 20. When jack 22 of device 18 is plugged into such a jack 24, device 18 is also able to detect that communications system 20 is not POTS, and correspondingly utilize its non-POTS capability, in this case, ISDN capability as afforded by its terminal adapter capability.

The integral line-type detector of communications device 18 provides for a number of advantages. First, a computer user does not have to have a separate device for each type of communications system with which the computer may communicate. For example, rather than having both a separate analog modem for POTS and a separate terminal adapter for ISDN, only one device is needed. Second, the computer user need not worry about possible damage that may result when plugging in the wrong device into a given wall jack. For example, plugging an ISDN terminal adapter to a jack for a POTS line may permanently damage the adapter. The communications device of the invention provides for a line-type detector that ensures that this situation will not occur.

Figure 2:
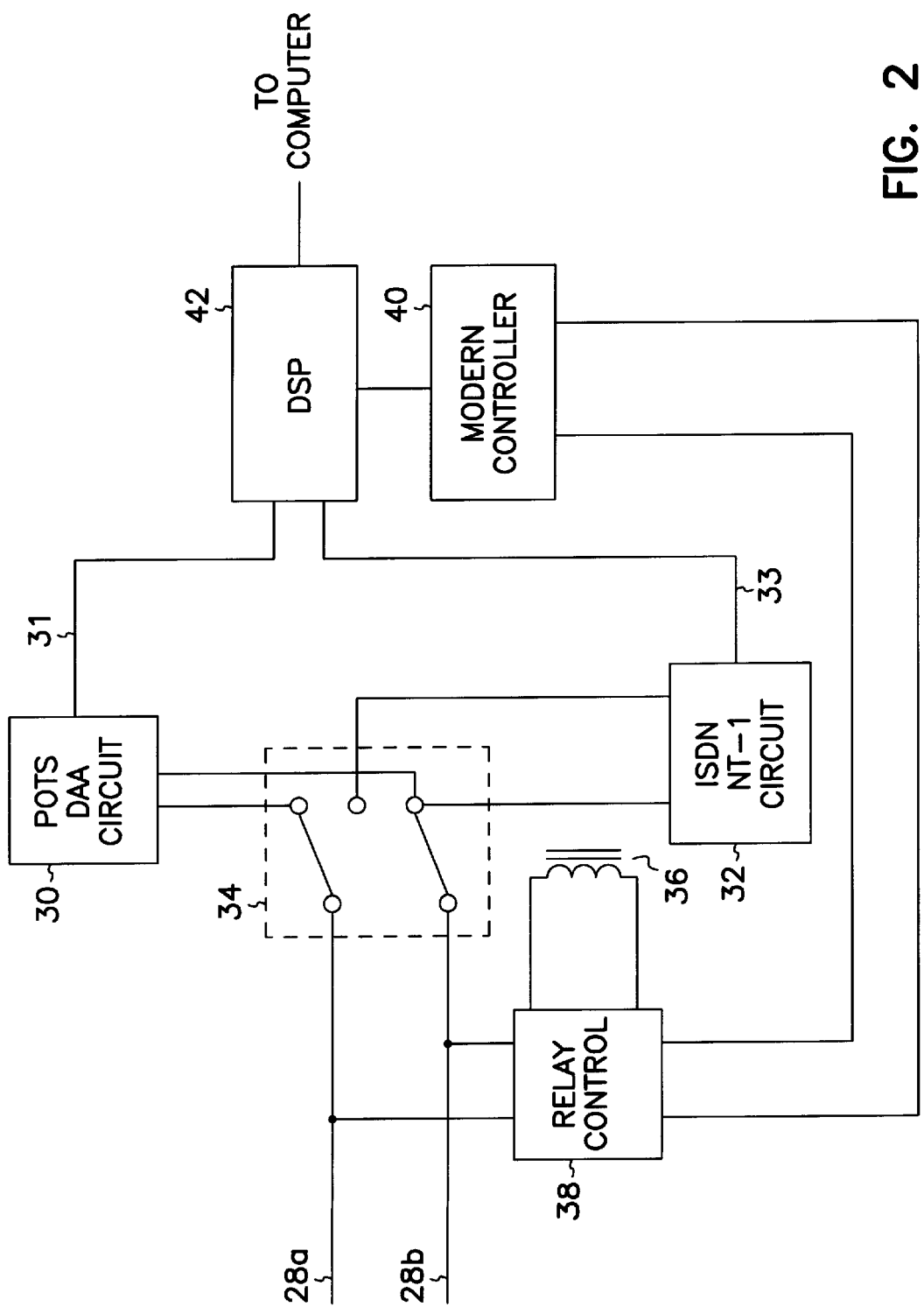
FIG. 2 is a block diagram of a communications device including a line-type detector according to a preferred embodiment of the invention; and, FIG. 3 is a flowchart of a method to detect a communications line type according to a preferred embodiment of the invention.

Referring now to FIG. 2, a block diagram of a communications device including a line-type detector according to a preferred embodiment of the invention. The device shown in FIG. 2 is able to detect between a POTS and a non-POTS line, such as ISDN, and configure accordingly. As described in conjunction with FIG. 2, the device switches between POTS and ISDN. However, the invention is not so limited, and the invention is amenable to the device switching between POTS and another non-POTS line.

The incoming communications line from either ISDN or the POTS includes two separate conductors 28a and 28b, as is normally found in ISDN and POTS line installations. Conductors 28a and 28b are coupled to either POTS digital-analog adapter DAA circuit 30 or ISDN NT-1 circuit 32, as directed by double-pole, double-throw (DPDT) switch 34. (Note that a two-conductor ISDN line is communicatively coupled to a circuit 32 having what is known as a U interface; ISDN is also available over a four-conductor line that communicatively couples to a circuit 32 having what is known as an ST interface.)

DPDT switch 34 is controlled by relay 36, which is itself controlled by relay control 38. In a first default position, switch 34 normally directs conductors 28a and 28b to POTS DAA circuit 30 (i.e., when relay control 38 is not providing power to relay 36). In a second position, relay control 38 provides power to relay 36 such that switch 34 directs conductors 28a and 28b to ISDN NT-1 circuit 32. Therefore, the communications line is at any given time only coupled to either a POTS circuit (circuit 30), or a non-POTS circuit, such as an ISDN circuit (circuit 32).

Relay control 38 is operatively coupled to conductors 28a and 28b. Control 38 passes the signal detected on conductors 28a and 28b onto modem controller 40. Modem controller 40 listens for two frequencies that make up a dial tone on a POTS line, 350 Hz and 440 Hz. If controller 40 cannot detect both of these frequencies, it directs relay control 38 to turn on relay 36, so that switch 34 directs conductors 28a and 28b to ISDN NT-1 circuit 32. If controller 40 detects both of the dial tone frequencies, relay control 38 is not directed to turn on relay 36, and switch 34 maintains its direction of conductors 28a and 28b to POTS DAA circuit 30. Modem controller 40 is in one embodiment a TMS-320 controller available from Texas Instruments, Inc. Controller 40 desirably has analog inputs so that it is able to read POTS signals.

Those of ordinary skill within the art will recognize that changes may be made to the embodiment of FIG. 2 without departing from the spirit or scope of the invention. For example, relay 36 with its corresponding control 38 may be replaced by an electronic switching apparatus that includes transistors and other electronic components instead of the mechanical-oriented components such as relays as has been described. In addition, the embodiment of the invention shown in and described in conjunction with FIG. 2 switches between a POTS and an ISDN communications line. However, the invention is not so limited, and is amenable to switching between a POTS line and any other non-POTS line.

Modem controller 40 also controls the operation of modem digital signal processor (DSP) 42 in one of two modes. When controller 40 detects the presence of the POTS dial tone frequencies, it enters DSP 42 into a POTS mode, such that DSP 42 sends data from the computer to which it is coupled to the incoming communications line, and vice-versa, over POTS DAA circuit 30, in a manner similar to that performed by analog modems. When controller 40 does not detect the presence of the POTS dial tone frequencies, it enters DSP 42 into an ISDN mode, such that DSP 42 sends data from the computer to the incoming communications line, and vice-versa, over ISDN NT-1 circuit 32, in a manner similar to that performed by ISDN terminal adapters. Controller 40 thus controls both the direction of conductors 28a and 28b through switch 34 by control 38 and relay 36, to either circuit 30 or circuit 32, and also the mode in which DSP 42 operates, either as an analog modem communicating with circuit 30, or as a terminal adapter communicating with circuit 32.

DSP 42 is communicatively coupled to DAA circuit 30 and ISDN NT-1 circuit 32 via lines 31 and 33, respectively. Each line 31 and 33 preferably includes two or more conductors, such that each has conductors corresponding to at least conductors 28a and 28b of the incoming communications line. The ISDN NT-1 circuit 32, for example, may communicatively couple DSP 42 via a four-conductor line 33, in which case circuit 32 has an ST interface, or via a two-conductor line 33, in which case circuit 32 has a U interface. Furthermore, in one embodiment, controller 40 and DSP 42 are on the same integrated circuit (IC), as is the case with the TMS-320 controller. In such instance, the combined chip, besides having analog inputs, also includes DSP data pumps, and circuitry to determine whether a (POTS) dial tone is present at the analog inputs, as known within the art. The invention is not so particularly limited, however.

POTS DAA circuit 30 and modem DSP 42 in its POTS mode together constitute an analog modem, the construction and operation of which are known within the art. U.S. Pat No. 5,452,289, entitled "Computer-based multifunction personal communications system," which is hereby incorporated by reference, describes in detail the operation of such modem technology and modem-based computerized communications. DSP 42 in its POTS mode includes coder/decoder (CODEC) functionality, which is typically a discrete component. DSP 42 in its POTS mode performs functionality such as modulation, demodulation and echo cancellation to communicate over a POTS line. DSP 42 in its POTS mode also performs digital to analog (D/A) conversion, analog to digital (A/D) conversion, coding/decoding, and gain control, as known within the art. DAA circuit 30 permits the analog modem functionality provided by DSP 42 in its POTS mode to connect to a preexisting POTS telecommunications system.

A detailed description of a DSP without CODEC functionality, a separate CODEC, and a telephone interface (viz., a DAA) in direct connection and cooperation with one another is described in the publication entitled "AT&T V.32bis/V.32/FAX High-Speed Data Pump Chip Set Data Book" published by AT&T Microelectronics, December 1991, which is hereby incorporated by reference. The AT&T data pump chip set described in this reference comprises the core of an integrated, two-wire full duplex modem which is capable of operation over standard POTS lines. The data pump chip set conforms to the telecommunications specifications in CCITT recommendations V.32bis, V.32, V.22bis, V.22, V.23, v.21 and is compatible with the Bell 212A and 103 modems. Speeds of 14,400, 9600, 4800, 2400, 1200, 600 and 300 bits per second are supported. This chip set consists of a ROM-coded DSP16A digital signal processor U37 (viz., a DSP) and interface chip (viz., a DAA) U34, and an AT&T T7525 linear CODEC U35 (viz., a CODEC). The AT&T V.32 data pump chip set is available from AT&T Microelectronics.

ISDN NT-1 circuit 32 and modem DSP 42 in its ISDN mode together constitute an ISDN terminal adapter, or ISDN modem, the construction and operation of which are known within the art. The publication James Y. Bryce, *Using ISDN*, (Que Corporation: 1995), which is hereby incorporated by reference, describes in detail the operation of such modem technology and ISDN-based computerized communications. DSP 42 in its ISDN mode performs functionality such as data compression, data decompression, and error-checking, and optionally functionality such as Multi Point-to-Point (PPP) protocol compatibility. ISDN NT-1 circuit 32 performs the network termination (NT)function necessary in ISDN lines; that is, it permits the ISDN terminal adapter functionality provided in part by DSP 42 in its ISDN mode to connect to a preexisting ISDN telecommunications system.

A detailed description of the functionality of an NT-I is described in the publication, "Integrated Services Digital Network (ISDN) Basic Access Interface for Use on Metallic Loops for application on the Network Side of the NT (Layer 1 Specification" published by the American National Standards Institute, Inc. (ANSI) as approved on Feb. 21, 1992, as ANSI T1.601-1992, which is hereby incorporated by reference. This publication presents the electrical characteristics of the ISDN basic access signals appearing at the network side of the NT. It also describes the physical interface between the network and the NT. The transport medium of the signal is a single twisted-wire pair that supports full-duplex service.

Figure 3:
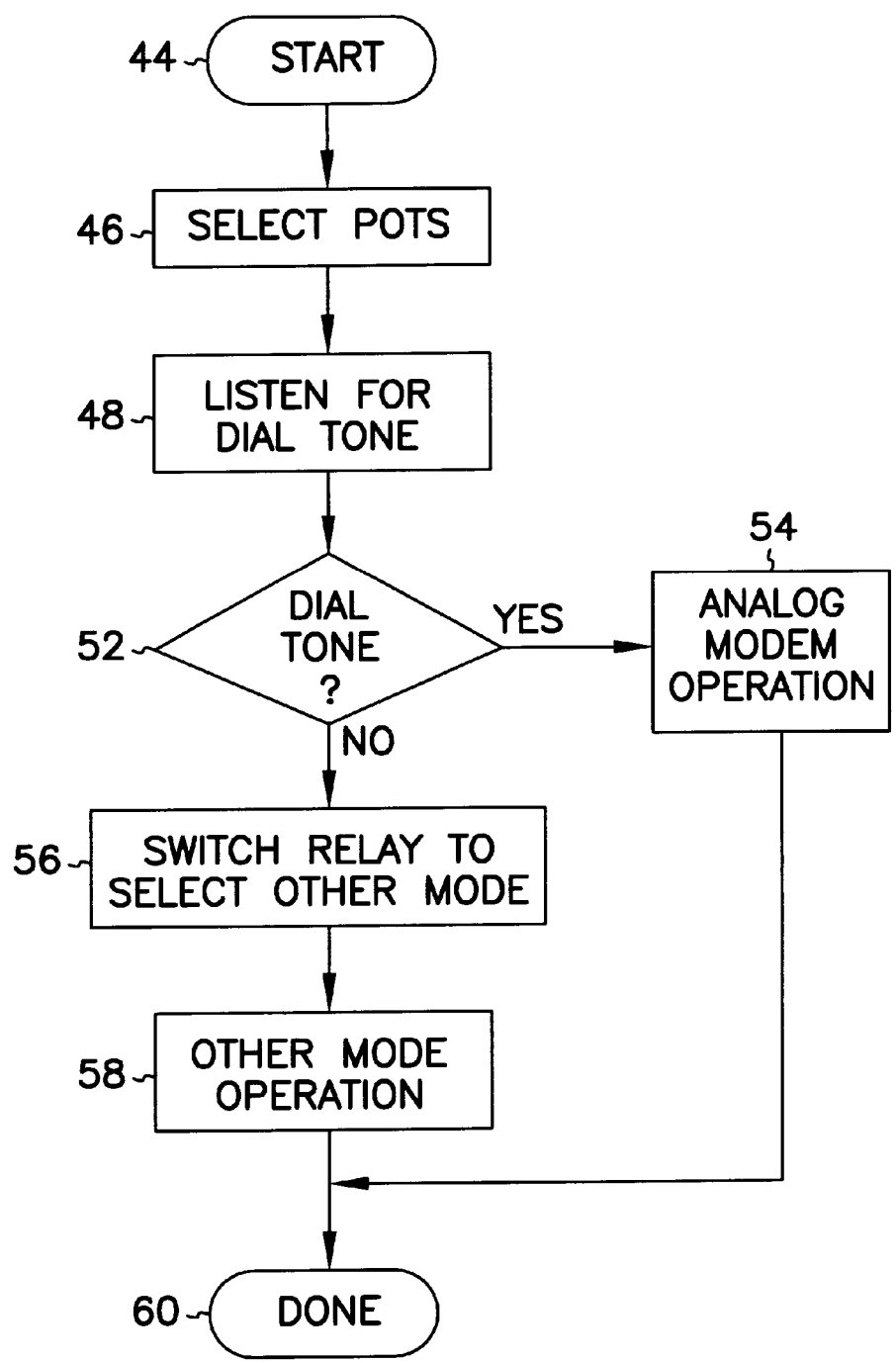

Referring now to FIG. 3, a flowchart of a method to detect a communications line type according to a preferred embodiment of the invention is shown. The method is described in conjunction with the preferred embodiment of the invention shown in FIG. 2; however, the method is not so limited, and is applicable to other configurations of the invention as well. From the starting point of step 44, control proceeds to step 46, in which step a relay (such as relay 36 of FIG. 2) is by default closed to select POTS mode.

In step 48, the method attempts to draw a dial tone, which is accomplished by listening for the two frequencies present in a POTS dial tone, a 350 Hz frequency and a 440 Hz frequency. With respect to the configuration of FIG. 2, this step is accomplished by the modem controller 40. If a dial tone is present, control proceeds from step 52 to step 54, and the communications device proceeds in analog modem mode (e.g., DSP 42 of FIG. 2 receives and sends communications signals through POTS DAA circuit 30 of FIG. 2), as known within the art.

If a dial tone is not present, control proceeds from step 52 to step 56, in which step the relay (such as relay 36 of FIG. 2) is switched to select an alternative mode, such as ISDN, ADSL, etc. The communications device then operates in this alternative mode in step 58 (e.g., DSP 42 of FIG. 2 receives and sends communications signals through ISDN NT-1 circuit 32 of FIG. 2, in the case where the alternative mode is ISDN), as known within the art. From either step 54 or step 58, control proceeds to step 60, at which step the method is finished.

The automatic detection of POTS lines has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

I claim:

1. A computerized system comprising:
   a) a computer having at least a processor and a memory;
      a communications device operatively coupled to the computer, and operatively coupled to a communications line of a particular type;
   b) a line-type detector operatively coupled to the communications device to detect whether the particular type of the communications line is a plain old telephone system (POTS) line, and correspondingly configure the communications device, the line-type detector further comprising:
      i) a pair of circuitry, one circuitry specific to POTS, the other circuitry specific to a communications line type other than POTS; and
      ii) a controller to switch between the pair of circuitry depending on whether POTS was detected, the controller further comprising:
         A) a relay;
         B) a relay control operatively coupled to the relay;
         C) a modem controller operatively coupled to the relay control; and
         D) a modem digital signal processor (DSP) operatively coupled to the modem controller.

2. The computerized system of claim 1, wherein the particular type of communications line is selected from the group consisting of plain-old telephone system (POTS), integrated services digital network (ISDN), and asynchronous digital subscriber line (ADSL).

3. The computerized system of claim 1, wherein the communications device includes analog modem capability and terminal adapter capability.

4. The computerized system of claim 1, wherein the line-type detector is integrated into the communications device.

5. A communications device to couple a computer to a communications line of a particular type comprising:
   a pair of circuitry, one circuitry specific to POTS, the other circuitry specific to a communications line type other than POTS; and,
   a controller to detect whether the particular type of the communications line is POTS and correspondingly switch between the pair of circuitry depending on whether POTS was detected, the controller comprising:
      i) a relay;
      ii) a relay control operatively coupled to the relay;
      iii) a modem controller operatively coupled to the relay control; and,
      iv) a modem digital signal processor (DSP) operatively coupled to the modem controller.

6. The communications device of claim 5, wherein the controller switches between the POTS circuitry and the other circuitry incident to detection of at least one dial tone frequency.

7. The communications device of claim 6, wherein the at least one dial tone frequency comprises a 350 Hz frequency and a 440 Hz frequency.

8. A communications device to couple a computer to a communications line of a particular type selected from the group consisting of POTS and ISDN, the communications device comprising:
   a POTS digital-analog adapter (DAA);
   an TSDN NT-1 adapter;
   a relay to switch between the POTS DAA and the TSDN NT-1 adapter; and
   a controller to detect the particular type of communications line and direct the relay to switch accordingly, the controller comprising:
      a modem digital signal processor (DSP);
      a modem controller operatively coupled to the modem DSP; and,
      a relay control operatively coupled to the modem controller.

9. The communications device of claim 8, wherein the controller detects at least one dial tone frequency and directs the relay to switch accordingly incident to detection of the at least one dial tone frequency.

10. The communications device of claim 9, wherein the at least one dial tone frequency comprises a 350 Hz frequency and a 440 Hz frequency.

11. A method for configuring a communications device for a computer having a connector to operatively couple to a communications line, the method comprising:
   a) providing a line-type detector operatively coupled to the communications device to detect whether the particular type of the communications line is a plain old telephone system (POTS) line, and correspondingly configure the communications device, the line-type detector further comprising:
      i) a pair of circuitry, one circuitry specific to POTS, the other circuitry specific to a communications line type other than POTS; and
      ii) a controller to switch between the pair of circuitry depending on whether POTS was detected, the controller further comprising:
         A) a relay;
         B) a relay control operatively coupled to the relay;
         C) a modem controller operatively coupled to the relay control; and
         D) a modem digital signal processor (DSP) operatively coupled to the modem controller.
   b) detecting whether the particular type of communications line is a POTS line by detecting at least one dial tone frequency at the connector;
   c) initializing the communications device for POTS communication upon detecting the at least one dial tone frequency;
   d) detecting whether the particular type of communications line is other than POTS upon failing to detect the at least one dial tone frequency; and
   e) switching to the circuitry specific to the communications line type other than POTS and initializing the communication device for a type of communication other than POTS.

12. The method of claim 11, wherein the at least one dial tone frequency comprises a 350 Hz frequency and a 440 Hz frequency.

* * * * *